(12) United States Patent
Lee et al.

(10) Patent No.: US 8,745,662 B2
(45) Date of Patent: Jun. 3, 2014

(54) METHOD OF TRANSMITTING PREVIEW CONTENT AND METHOD AND APPARATUS FOR RECEIVING PREVIEW CONTENT

(75) Inventors: Yoon Ei Lee, Seoul (KR); Joon Hwi Lee, Seoul (KR); Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1042 days.

(21) Appl. No.: 12/005,613

(22) Filed: Dec. 28, 2007

(65) Prior Publication Data

US 2008/0168496 A1 Jul. 10, 2008

(30) Foreign Application Priority Data

Jan. 4, 2007 (KR) ........................ 10-2007-0000977

(51) Int. Cl.
*G06F 3/00* (2006.01)
*G06F 13/00* (2006.01)
*H04N 5/445* (2011.01)
*H04N 21/84* (2011.01)

(52) U.S. Cl.
CPC .................................... *H04N 21/84* (2013.01)
USPC .......................................................... 725/41

(58) Field of Classification Search
None
See application file for complete search history.

(56) References Cited

U.S. PATENT DOCUMENTS

| | | | |
|---|---|---|---|
| 5,751,282 A | 5/1998 | Girard et al. | |
| 5,812,123 A | 9/1998 | Rowe | |
| 5,907,323 A | 5/1999 | Lawler et al. | |
| 6,526,577 B1 | 2/2003 | Knudson et al. | |
| 2003/0005429 A1 | 1/2003 | Colsey | |
| 2003/0039271 A1* | 2/2003 | Mizuno | 370/486 |
| 2003/0126605 A1 | 7/2003 | Betz et al. | |
| 2005/0152296 A1* | 7/2005 | Lee et al. | 370/312 |
| 2006/0059526 A1 | 3/2006 | Poslinski | |
| 2006/0126597 A1* | 6/2006 | Chae et al. | 370/352 |
| 2007/0118872 A1* | 5/2007 | Song et al. | 725/135 |
| 2008/0155613 A1* | 6/2008 | Benya et al. | 725/89 |
| 2009/0013351 A1* | 1/2009 | Liao et al. | 725/39 |
| 2010/0115557 A1* | 5/2010 | Billmaier et al. | 725/44 |
| 2011/0225612 A1* | 9/2011 | Vaysman et al. | 725/40 |

FOREIGN PATENT DOCUMENTS

| | | |
|---|---|---|
| CN | 1662880 | 8/2005 |
| CN | 1682530 | 10/2005 |
| EP | 1 465 417 | 10/2004 |
| WO | WO 2003/058954 | 7/2003 |
| WO | WO 2004/001518 | 12/2003 |

* cited by examiner

*Primary Examiner* — Nathan Flynn
*Assistant Examiner* — Omar S Parra
(74) *Attorney, Agent, or Firm* — McKenna Long & Aldridge LLP

(57) ABSTRACT

Provided is a method of transmitting preview content and a method and apparatus for receiving the preview content, wherein the method of transmitting preview content includes providing program guide service information by a content server to a program guide server; transmitting the program guide service information by the program guide server to a receiving apparatus when the program guide server is accessed by the receiving apparatus; and transmitting preview content corresponding to contents of the program guide service information by a preview content server to the receiving apparatus when the preview content server is accessed by the receiving apparatus.

19 Claims, 8 Drawing Sheets

FIG. 2

| Element / Attribute Name | Element / Attribute Description | Mandated/ Optional |
|---|---|---|
| BCGOffering type: | /BCGDiscovery | |
| BCG | BCG record | M |
|   BCG@Id | Identifies a Broadband Content Guide Provider, Server this Id is allocated by the Service Provider | M |
|   BCG@Version | Version of this record. A change in this value indicates a change in one of the BCG Records | O |
|   Name | Name of the Broadband Content Guide offering for display in one or more languages; one name is allowed per language code, and at least one language shall be provided (though not necessarily more than one) | M |
|   Description | Description of the Broadband Content Guide for potential display in one or more languages; one description per language code | O |
|   Logo | A pointer to an optional logo for the content guide | O |
|   Type | This indicates if the content guide relates to live programs, content on demand, both, or some other form of content The extensible classificition scheme provided in the present document shall be used | O |
|   TargetProvider | The domain name of the provider whose content is described by this BCG (for example Canal +). The domainName shall be the same as a domain name present in the ServiceList. | O |
|   TransportMode | The location where the broadband content guide may be found | M |
|     DVBSTP | Specifies the location at which the content guide is available using the DVBSTP protocol, and details the relevant segments that are being transmitted | O |
|     http@Location | Specifies the location at which the guide may be found | M(if the http element is used) |
|     http@SOAP | Indicates if the guide may be queried using the SOAP protocol rather the mechanism outline in clause 5, 4, 2. The default value of this attribute is "false" | O |
|   BCGProviderName | The name of the BCG provider (for example "Telerama") This field shall be identical to the textual string of the Publisher attribute of the TVAMain element in the BCG metadata | O |
|   PreviewAvailability | A boolean which indicates if the content preview is available. The availability of content preview is provided by Service provider. The default value is false. | O |
|     PreviewInformation | specifies preview information including a media locator when the content preview is available. | O |

FIG. 3

| Index | Type | Description |
|---|---|---|
| 1 | PreviewCategory | Type of preview content (Series, sports, action, arts, etc.) |
| 2 | PreviewMediaType@id | Predefined media format type of the preview content (Image, video, audio, text) |
| 3 | DisplayMode | Display mode of media (Slide, trail, etc.) |
| 4 | Position | Position at which the preview content is to be displayed |
| 5 | Size | Size of which the preview content is to be displayed |
| 6 | StartTime | Start time at which the preview content is to be displayed |
| 7 | Duration | Time duration the preview content is to be displayed |
| 8 | PreviewDescription | Brief description of the preview content |
| 9 | MediaLocator | Address of the media files of the preview content (URI format which supports all transport protocols) |
| 10 | AssociatedMediaLocator | Address of contents related to the preview content (CRID format) |

FIG. 4

| MediaType | ID | Format | Description |
|---|---|---|---|
| Image | 1 | Image/gif | A GIF formatted image file |
| | 2 | Image/jpeg | A JPEG formatted image file |
| | 3 | Image/tiff | A TIFF formatted image file |
| | 4 | Image/x-xbitmap | An XBM formatted image file |
| Text | 5 | Text/plain | A plain ascii text file |
| | 6 | Text/html | An HTML formatted text file |
| | 7 | Text/xml | An XML formatted text file |
| Audio | 8 | Audio/basic | A basic audio file format |
| | 9 | Audio/x-mpeg | An MPEG formatted audio file |
| | 10 | Audio/x-wav | WAV formatted audio file |
| Video | 11 | Video/quicktime | A Quicktime formatted video file |
| | 12 | Video/avi | An AVI formatted video clip |
| | 13-100 | | User defined |

METHOD OF TRANSMITTING PREVIEW CONTENT AND METHOD AND APPARATUS FOR RECEIVING PREVIEW CONTENT

CROSS-REFERENCE TO RELATED APPLICATION

This application claims priority from Korean Patent Application No. 10-2007-0000977 filed on Jan. 4, 2007 in the Korean Intellectual Property Office, the disclosure of which is incorporated herein by reference in its entirety.

BACKGROUND OF THE INVENTION

1. Field of the Invention

The present invention relates to a method of transmitting preview content stored in a preview content server to a receiving device and a method and apparatus for receiving the preview content.

2. Description of the Related Art

Generally, audio and video signals of television broadcasts are transmitted via terrestrial, cable and satellite signal transmitting mediums to be received by a television receiver or a set-top box to display the broadcasts to viewers.

In addition to such conventional ways of transmitting television broadcasts, advancements made in digital television technology and Internet networking technology make it possible to provide live broadcasts, news, game channels and various contents on demand (COD) through a broadband Internet connection.

As one of examples of providing various contents through a broadband Internet network, Internet Protocol Television (IPTV) provides various services such as predetermined information and video contents using an IPTV server also connected to a broadband Internet network.

While broadcast contents provided by IPTV are similar to the contents provided through terrestrial, cable and satellite broadcasts, IPTV is different in that IPTV servers and receiving devices are able to perform bidirectional transmission. Thus, viewers are able to select a desired broadcast content to watch the content at a convenient time.

Digital television broadcasts transmitted over the conventional transmitting mediums are now generally provided with an electronic program guide (EPG) processed by service information table (SI). Similarly, IPTV also provides program guide services to receiving devices.

In contrast to EPG service provided over the conventional transmitting mediums, IPTV program guide service is provided to viewers by transmitting the program guide to a receiving device via a broadband network having a bandwidth wider than the conventional transmitting mediums.

The IPTV program guide typically includes channel information, title and broadcast time of contents of each channel, description of the contents, and access location.

The receiving device then receives the program guide service information and displays the program guide in text format or in a format customized to include the logo of a broadcast provider.

However, the program guide does not provide a brief description of broadcast contents such as preview information which viewers can refer to in advance. Thus, viewers cannot obtain more information about the broadcast contents and must speculate the nature of the broadcast contents from the title displayed in the program guide provided in text format, which often results in viewers actually watching broadcasts which they may not be interested in for certain duration of time.

SUMMARY OF THE INVENTION

Aspects of the present invention provide a method of transmitting preview content, in which preview content stored in a preview content server is transmitted to a receiving apparatus.

Aspects of the present invention also provide a method and apparatus for receiving preview content, in which the apparatus determines the availability of preview content using program guide service information provided by a program guide server and accesses a preview content server and downloads the available preview content.

Aspects of the present invention also provide a method and apparatus for receiving preview content, in which preview content corresponding to contents of program guide service information is displayed on a display unit of the apparatus with the program guide service information.

Aspects of the present invention also provide a method and apparatus for receiving preview content, in which preview content displayed on a display unit of the apparatus is displayed with a progress bar to allow viewers to easily determine the playtime progress of the preview content.

According to the above aspects, a content server provides the program guide service information to the program guide server. The program guide server includes preview availability information which indicates the availability of preview content corresponding to the content of the program guide and preview information which specifies the available preview content.

The program guide server provides the program guide service information to the receiving apparatus when the receiving apparatus accesses the program guide server through a network. Using the program guide service information, the receiving apparatus requests the preview content from the preview content server which then transmits the preview content to the receiving apparatus through the network.

The receiving apparatus displays the program guide service information with the preview content received from the preview content server when a user inputs a program guide service information display command.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a method of transmitting preview content. The method includes: providing program guide service information by a content server to a program guide server; transmitting the program guide service information by the program guide server to a receiving apparatus when the program guide server is accessed by the receiving apparatus; and transmitting preview content corresponding to contents of the program guide service information by a preview content server to the receiving apparatus when the preview content server is accessed by the receiving apparatus.

The method may further include: providing access information of the program guide server and the preview content server by the program guide server to a service discovery server; and transmitting the access information by the service discovery server to the receiving apparatus, wherein the receiving apparatus accesses the program guide server and the preview content server by using the access information.

The transmitting of the access information by the service discovery server to the receiving apparatus may be implemented by a unicast method which transmits the access information to the receiving apparatus when the receiving apparatus accesses the service discovery server and requests the access information.

The transmitting of the access information by the service discovery server to the receiving apparatus may be implemented by a multicast method which transmits the access information to receiving apparatus if the receiving apparatus is registered with a service discovery group.

The preview guide information may include preview availability information which indicates availability of preview content and preview information which specifies the available preview content.

The preview information may include at least one of a preview category, a preview media type, a preview display position, a preview size, a preview start time, a preview display duration, a brief preview description, a preview media locator, and an associated media locator.

The preview media type may include at least one of preview image format information, text format information, audio format information, and video format information.

The transmitting of the program guide service information by the program guide server to the receiving apparatus may be performed when the receiving apparatus accesses the program guide server and requests the program guide service information.

The transmitting of the preview content corresponding to the contents of the program guide service information by the preview content server to the receiving apparatus may be performed when the receiving apparatus requests the corresponding preview content after determining availability of the preview content using the program guide service information transmitted from the program guide server.

According to another aspect of the present invention, there is provided an apparatus for receiving preview content. The apparatus includes: a network interface unit which receives packets including access information, program guide service information, and the preview content; an Internet Protocol (IP) manager which transmits the received packets to a relevant manager according to a protocol; a service discovery manager which parses the packets according to a discovery protocol and a selection protocol and extracts the access information, the program guide service information, and the preview content; and an application/user interface (UI) manager which controls the network interface unit that access a service discovery server and receives the access information, accesses a program guider server using the access information and receives the program guide service information, and accesses a preview content server using the access information and receives the preview content.

The apparatus may further include a service information database unit which stores the access information, the program guide service information, and the preview content.

The preview guide information may include preview availability information which indicates availability of preview content and preview information which specifies the available preview content.

The apparatus may further include a display unit which displays the program guide service information and the preview content according to control of the application/UI manager.

According to another aspect of the present invention, there is provided a method of receiving preview content. The method includes: receiving program guide service information by a network interface unit which accesses a program guide server according to control of an application/user interface (UI) manager; receiving preview content corresponding contents of the program guide service information by the network interface unit which access a preview content server according to control of the application/UI manger; and simultaneously displaying the program guide service information and the preview content on a display unit.

The network interface unit may access a service discovery server and receive access information and access the program guide server and the preview content server using the access information, according to control of the application/UI manager.

The preview guide information may include preview availability information which indicates availability of preview content and preview information which specifies the available preview content.

The preview information may include at least one of a preview category, a preview media type, a preview display position, a preview size, a preview start time, a preview display duration, a brief preview description, a preview media locator, and an associated media locator.

The preview media type may include at least one of preview image format information, text format information, audio format information, and video format information.

The application/UI manager may determine availability of the preview content using the program guide service information and request the available preview content from the preview content server to be received by the network interface unit.

The displaying of the preview guide information may be performed when there is a display command to display the preview guide information.

BRIEF DESCRIPTION OF THE DRAWINGS

The above and other aspects and features of the present invention will become more apparent by describing in detail exemplary embodiments thereof with reference to the attached drawings, in which:

FIG. 2 is a diagram showing an example of a broadband content guide (BCG) discovery record in a table format as program guide service information according to an exemplary embodiment of the present invention, in which the program guide includes preview availability information indicating the availability of preview content and preview information which specifies available preview content;

FIG. 3 is a diagram showing, in a table format, the preview information which specifies the available preview content, according to an exemplary embodiment of the present invention;

FIG. 4 is a diagram showing, in a table format, the preview media type of the preview information shown in FIG. 3, according to an exemplary embodiment of the present invention;

DETAILED DESCRIPTION OF THE EXEMPLARY EMBODIMENTS

Figure 1:
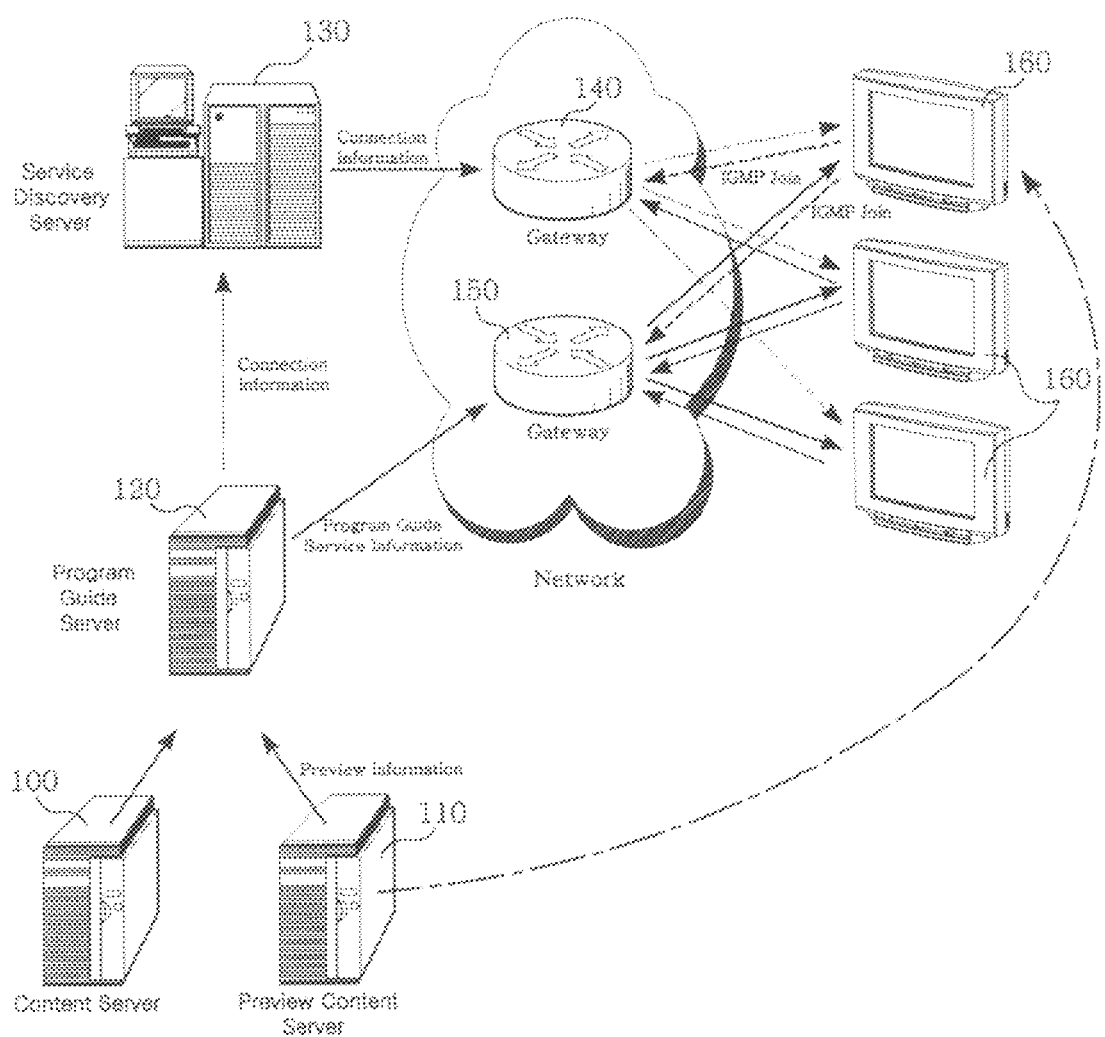
FIG. 1 is a block diagram showing the structure of a system for providing preview content, which has been implemented with a method of transmitting preview content according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Wherever possible, the same reference numerals will be used throughout the drawings to refer to the same or like parts.

FIG. 1 is a block diagram showing the structure of a system for providing preview content, which has been implemented with a method of transmitting preview content according to an exemplary embodiment of the present invention. As shown in FIG. 1, a system for transmitting preview content, according to the present invention, includes a content server 100, a preview content server 110, a program guide server 120, a service discovery server 130, a first gateway 140, and second gateway 150, and a receiving apparatus 160.

The content server 100 is stored with at least one content and provides program guide service information including the title and description of the contents to the program guide server 120. According to the present invention, the program guide service information includes information which indicates availability of preview content and preview information which specifies the available preview content.

The preview content server 110 includes at least one preview content corresponding to the contents stored in the content server 100. For example, the preview content may include corresponding audio and video (A/V) signals, text, A/V signals of preview program for the corresponding content, and a still image exemplifying the corresponding content.

The program guide server 120 stores the program guide service information provided from the content server 100 and provides the program guide service information stored therein to the receiving apparatus 160 when the receiving apparatus 160 requests the program guide service information.

Additionally, the program guide server 120 provides access information of servers providing predetermined services through a network to the service discovery server 130. That is, the program guide server 120 provides the access information to the service discovery server 130 to enable the receiving apparatus 160 to access the program guide server 120, the content server 100, and the preview content server 110.

The service discovery server 130 receives and stores the access information of each server provided from the program guide server 120 and provides the access information stored therein to the receiving apparatus 160 when the receiving apparatus 160 requests the access information.

The receiving apparatus 160 requests the access information from the service discovery server 130 by accessing the service discovery server 130 through the first gateway 140 when being booted. That is, the receiving apparatus 160 accesses the service discovery server 130 via the first gateway 140 to request the access information which can enable the receiving apparatus 160 to access the content server 100, the preview content server 110, and the program guide server 120. Then, the service discovery server 130 provides the access information to the receiving apparatus 160 via the first gateway 140.

Here, the receiving apparatus 160 requests the access information and the service discovery server 130 transmits the access information via a unicast method. Thus, the first gateway 140 is a gateway that supports the unicast method.

The unicast method is a 1:1 information transmitting method which enables the receiving apparatus 160 to request the access information from the service discovery server 130 which then transmits the access information to the receiving apparatus 160 via the first gateway 140.

Here, the unicast method may, for example, implement Hyper-Text Transport Protocol (HTTP) as specified by the DVB-IP Standard as a service discovery protocol for the service discovery server 130 to provide the access information.

Additionally, the receiving apparatus 160 may use Internet Group Management Protocol (IGMP) to be registered with a service discovery group via the first gateway 140. The receiving apparatus 160 registered with the service discovery group may then receive the access information of each server and play information via a multicast method. Thus, the first gateway 140 is a gateway that also supports the multicast method.

The service discovery server 130 simultaneously transmits a large amount of data to a plurality of receiving apparatuses 160 registered with the service discovery group through the multicast method. Here, the service discovery server 130 may periodically transmit the access information of each server to the receiving apparatuses 160 registered with the service discovery group.

The multicast method may, for example, implement Digital Video Broadcasting Service Discovery Transport Protocol (DVBSDTP) as specified by the DVB-IP Standard as a service discovery protocol for the service discovery server 130 to provide the access information.

Using the access information transmitted from the service discovery server 130, the receiving apparatus 160 accesses the program guide server 120 via the second gateway 150 and request the program guide service information. Then, the program guide server 120 transmits the program guide service information stored therein to the receiving apparatus 160 via the gateway 150. Here, the requesting and transmission of the program guide service information is carried out by the unicast method.

That is, through the unicast method, the receiving apparatus 160 can request the program guide service information from the program guide server 120, and the program guide server 120 can transmit the program information to the receiving apparatus 160. Additionally, if query is supported, the receiving apparatus 160 can selectively request desired program guide service information from the program guide server 120 to selectively receive only the desired program guide service information.

Here, the receiving apparatus 160 and the program guide server 120 may respectively request and transmit the program guide service information via Simple Object Access Protocol (SOAP) or HTTP.

The program guide sever 120 transmits the program guide service information to the receiving apparatus 160 only when the receiving apparatus 160 requests the program guide service information.

Then, the receiving apparatus 160 determines availability of preview content using the program guide service information. If it is determined there is available preview content, the receiving apparatus 160 accesses the preview content server 110 using the access information and requests the available preview content. The preview content server 110 then provides the preview content to the receiving apparatus 160.

FIG. 2 is a diagram showing an example of a broadband content guide (BCG) discovery record in a table format as program guide service information according to an exemplary embodiment of the present invention, in which the program guide includes preview availability information indicating the availability of preview content and preview information which specifies available preview content. As shown in FIG. 2, "BCGOffering type" in the BCG discovery record table indicates "BCGDiscovery".

"BCG" indicates "BDG record".

"DBG@Id" indicates an identifier (ID) of a Broadband Content Provider/Server, which is allocated by the service provider.

"BCG@version" indicates the BCG record version. Change of the version information indicates change in one of the BDG records.

"Name" indicates the name of the BCG which is offered in one or more languages.

"Description" indicates the description of the BCG which is offered in one or more languages.

"Logo" indicates a pointer for an optional logo for the BCG.

"Type" indicates the type of the BCG content. For example, the type of the BCG content may be a live program, content on demand (COD), or other form of content.

"TargetProvider" indicates the domain name of the content provider described in the present BCG.

"TransportMode" indicates the location where the BCG data may be found.

"DVBSTP" in the TransportMode indicates the location at which the BCG is provided using DVBSTP.

"http@Location" in the TransportMode indicates the location at which the BCG is provided using HTTP.

"http@SOAP" in the TransportMode indicates whether the BCG provided using HTTP uses SOAP. The default value is set at "false".

"BCGProviderName" indicates the name of the BCG provider.

In the present invention, "PreviewAvailability" and "PreviewInformation" are added to the BCG discovery record.

PreviewAvailabilty indicates availability of the preview content, in which the default value is set at "false".

PreviewInformation indicates information which specifies available preview content.

Here, in the present invention, the program guide service information provided by the program guider server 120 to the receiving apparatus 160 includes the preview availability information and the preview information provided in the BCG discover record table.

According to exemplary embodiments of the present invention, the providing of the preview availability information which indicates the availability of preview content and the preview information which specifies available preview content is not limited to the BCG discovery record table, and may be provided in anyone of tables in the program guide service information. Also, the preview availability information and the preview information may be provided in a separate table and transmitted to the receiving apparatus 160.

FIG. 3 is a diagram showing, in a table format, the preview information "PreviewInformation" which specifies the available preview content, according to an exemplary embodiment of the present invention. As shown in FIG. 3, the preview information includes "PreviewCategory, PreviewMediaType@id, DisplayMode, Position, Size, StartTime, Duration, PreviewDescription, MediaLocator, and AssociateMediaLocator."

PreviewCategory indicates the type of the preview content. For example, series, sport, action or art program is indicated.

PreviewMediaType@id indicates the predefined media format type of the preview content, for example, image, video, audio, or text format.

DisplayMode indicates the mode in which media is to be displayed, for example, slide or trail modes.

Position indicates the position at which the preview content is to be displayed.

Size indicates the size of which the preview content is to be displayed.

StartTime indicates the time at which the preview content is to be display.

Duration indicates the duration of time the preview content is to be displayed.

PreviewDescription indicates the brief description of the preview content.

MediaLocator indicates the address of the media files of the preview content. The address is in a Uniform Resource Identifier (URI) format that supports all transport protocols.

AssociateMediaLocator indicates the address of contents related to the preview content in Content Reference Identifiers (CRID) format.

FIG. 4 is a diagram showing, in a table format, the preview media type PreviewMediaType@id of the preview information PreviewInformation shown in FIG. 3, according to an exemplary embodiment of the present invention. As shown in FIG. 4, when the preview content is an image, the image is indicated as a Graphic Interchange Format (GIF), a Joint Photographic Coding Experts Group (JPEG), a Tagged Image File Format (TIFF) or an X-Bit Map (XBM) formatted file.

If the preview information is a text file, whether the text file is an American Standard Code for Information Interchange (ASCII) formatted text, a Hyper-Text Markup Language (HTML) formatted text, or an X-Bit Map (MAP) formatted text is indicated.

If the preview information is an audio file, whether the audio file is a BASIC formatted file, a Moving Picture Experts Group (MPEG) formatted file, or a Windows Wave (WAV) formatted file is indicated.

If the preview information is a video file, whether the video file is a Quicktime formatted file or an Audio Video Interleaved (AVI) formatted file is indicated.

Figure 5:
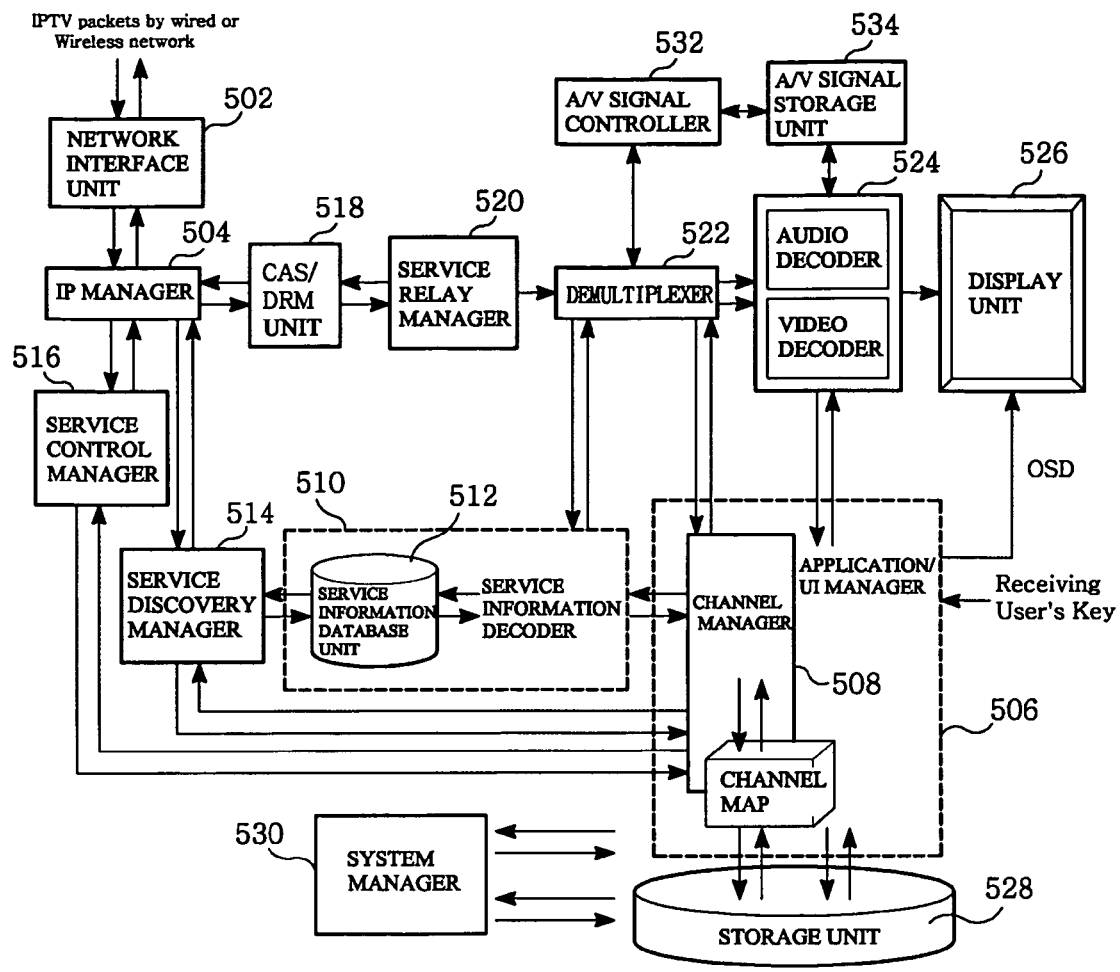
FIG. 5 is a block diagram showing the structure of an apparatus for receiving preview content, according to an exemplary embodiment of the present invention.

FIG. 5 is a block diagram showing the structure of an apparatus 160 for receiving preview content, according to an exemplary embodiment of the present invention. As shown in FIG. 5, the apparatus includes a network interface unit 502, an IP manager 504, an application/UI manager 506, a channel manager 508, a service information decoder 510, a service information database unit 512, a service discovery manager 514, a service control manager 516, a Conditional Access System/Digital Rights Management (CAS/DRM) unit 518, a service relay manager 520, a demultiplexer 522, an A/V decoder 524, a display unit 526, a storage unit 528, a system manager 530, an A/V signal controller 532, and an A/V signal storage unit 534.

The network interface unit 502 receives packets via a network and outputs packets provided by the receiving apparatus 160 to outside via the same network.

The IP manager 504 oversees the transmission of the packets received through the network interface unit 502 and the packets provided by the receiving apparatus 160 from a source of the packets to a final destination. Also, the IP manager 504 classifies the packets received through the network interface unit 502 to correspond to appropriate protocols.

The application/UI manager 506 provides a Graphic User Interface (GUI) using an On Screen Display (OSD) to allow a user to operate the receiving device 160, and relays operating commands corresponding to key signals input by the user through the GUI. For example, when a key signal input by the user correspond to a channel selection command, the UI manger 506 relays the channel selection command to the channel manager 508.

The channel manager 508 generates a channel map, and, when a channel selection command is transmitted from the application/UI manager 506, the channel manager 508 selects a channel according to the channel selection command and controls the service discovery manage 514. Additionally, the channel manager 508 receives channel service information from the service information decoder 510 and sets the Packet Identifier (PID) of an AV signal of the channel selected by the user when the AV signal is received by the demultiplexer 522.

The service information decoder 510 decodes service information such as Program Specific Information (PSI). That is, the service information decoder 510 receives and decodes a PSI section, a Program Service Information Protocol (PSIP) section or DVB-SI section demultiplexed by the demultiplexer 522.

The service information decoder 510 decodes the sections and generates and transmits a database corresponding to the service information to the service information database unit 512.

The service discovery manager 514 provides information needed to select a service provider. Additionally, the service discovery manager 514 receives a signal corresponding to the selected channel from the application/UI manager 506 and searches a service using the above information.

The service control manager 516 oversees the control of service selection. For example, when the user selects a service transmitted over the conventional transmitting mediums such as live broadcasting, the service control manager 516 uses an Internet Group Management Protocol (IGMP) or a Real-Time Streaming Protocol (RTSP) to control the service selection. When a service such as Video On Demand (VOD) service is selected by the user, the service control manager 516 uses RTSP.

RTSP may provide a trick mode for real-time streaming data.

The packets received through the network interface unit 502 and the IP manager are transmitted to the CAS/DRM unit 518 which oversees the conditional access system and the digital rights management.

The service relay manager 520 oversees the control of received service data. For example, the service relay manager 520 uses Real-Time Transport Protocol/RTP Control Protocol (RTP/RTCP) to control real-time streaming data.

Since, the real-time steaming data is transmitted using RTP, the service relay manager 520 parses the real-time streaming data using RTP and transmits the parsed data to the demultiplexer 522. Also, the service relay manager 510 feedbacks the received network information to the service provider's server.

The demultiplexer 522 demultiplexes and output received audio and video packets and PSI information to the AV decoder 524 and the service information decoder 510.

The A/V decoder 524 decodes the AV data output from the demultiplexer 522. Video data and audio data decoded by the A/V decoder 524 is displayed on the display unit 526 and output from a speaker (not shown), respectively.

The storage unit 528 stores data needed to setup the system (the receiving apparatus???) and use a Nonvolatile Random Access Memory (NVRAM) or a flash memory.

The system manager 530 controls the overall operation of the receiving apparatus 160.

The A/V signal controller 532 stores the A/V stream signal output from the demultiplexer 522 in the A/V signal storage unit 534. Additionally, the A/V signal controller 532 retrieves the A/V stream signal stored in the A/V signal storage unit 534 and provides the retrieved A/V stream signal to the A/V decoder 524 to be decoded. The video data decoded by the A/V decoder 524 is then displayed on the display unit 526, and the decoded audio data is output from the speaker.

When the receiving apparatus 160 is booted, the application/UI manager 506 request the access information by accessing the service discover server 130 through the service control manager 516, the IP manager 504, and the network interface unit 502. After receiving the request from the receiving apparatus 160, the service discovery server 130 transmits to the receiving apparatus 160 access information packets which will enable the receiving apparatus 160 to access the content server 100, the preview content server 110, and the program guide server 120.

Additionally, the receiving apparatus 160 may be registered with a service discover group to receive the access information packets from the service discovery server 130.

The access information packets transmitted from the service discovery server 130 are received through the network interface unit 502 and output to the IP manager 504.

The IP manager 504 determines whether the received access information packets are intended for the receiving apparatus 160, and transmits the access information packets to an appropriate manager block (???) according to the transmitting/receiving protocols if the access information packets are intended for the receiving apparatus 160. That is, the access information packets are transmitted to the service discovery manager 514.

The service discovery manager 514 manages the access information for each server by parsing the access information packets to obtain the access information which is then transmitted to the application/UI manager 506.

According to the access information, the application/UI manager 506 accesses the program guide server 120 through the service discovery manager 514, the IP manager 504, and the network interface3 unit 502 and requests the program guide service information.

When the request for the program guide service information has been made by the receiving apparatus 160, the program guide server 110 then transmits the program guide service information. When the request for the program guide service information has been made selectively by using a query method, the program guide server 110 transmits the selected access information to the receiving apparatus 160. The program guide service information includes preview availability information which indicates the availability of preview content and preview information which specifies available preview content.

The program guide service information provided by the program guide server 110 is received through the network interface unit 501, which is then transmitted to the application/UI manager 506 via the IP manager 504.

The application/UI manager 506 store and manages the program guide service information in the service information database unit 512.

Additionally, the application/UI manager 506 determines the availability of preview content using the program guide service information. If there is available preview content, the application/UI manager 506 accesses the preview content server 120 using the access information through the service discovery manager 514, the IP manager 504, and the network interface unit 502 and requests the available preview content.

According to the request for the available preview content, the preview content server 110 provides the available preview content to the receiving apparatus 160. The preview content transmitted from the preview content server 110 is received through the network interface unit 502, which is then transmitted to the application/UI manager 506 via the IP manager 504.

The UI manger 506 then stores and manages the preview content in the service information database unit 512. When a display commands for displaying the program guide is input by a user, the application/UI manager 506 displays the program guide using OSD along with the preview content.

Figure 6:
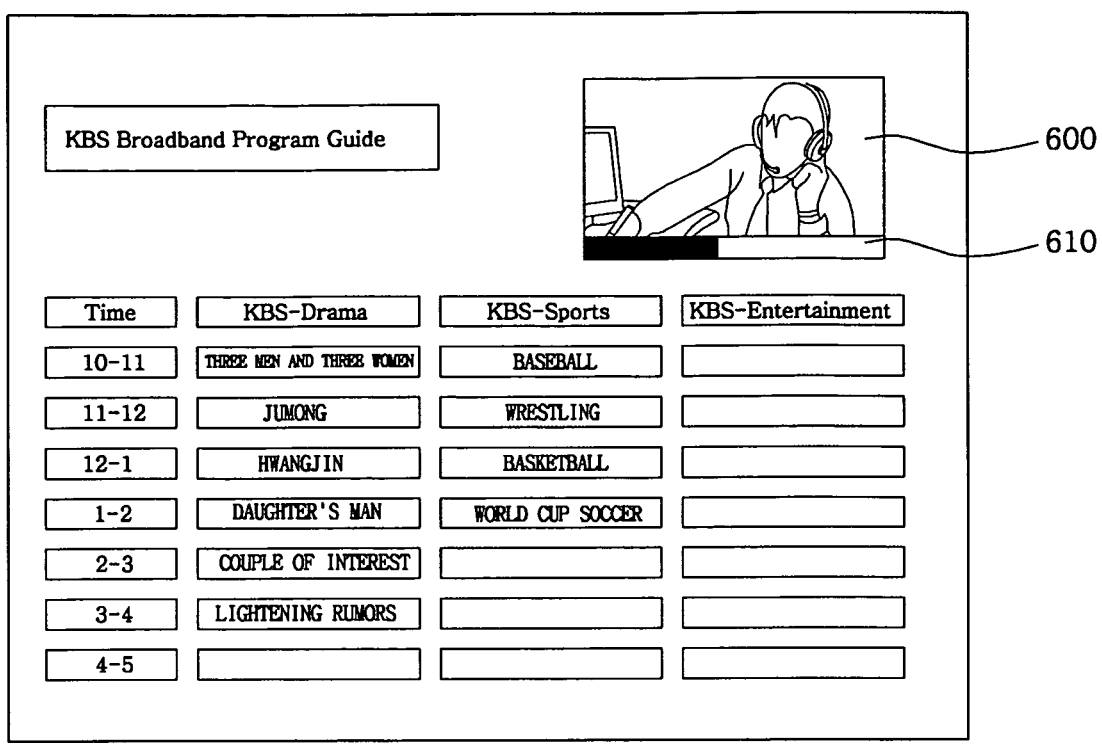
FIGS. 6 and 7 are diagrams for explaining the displaying of preview content by an apparatus for receiving preview content, according to an exemplary embodiment of the present invention.

As an example of displaying the program guide service information, as shown in FIG. 6, the program guide service information is displayed on a lower portion of the display unit 526 and the position of a cursor on content is determined. If preview content corresponding to the content indicated by the cursor is available, the preview content is displayed on a display region 600 located at an upper-right portion of the display unit 526.

Here, the preview content of video and still images can be displayed. If the preview content is audio data, the preview content is not displayed on the display region 600, but rather the audio data is output from the speaker. If the preview content is video data, the preview content is displayed on the display region 600 with a progress bar 610 which allows viewers to easily determine the playtime progress of the video preview content.

Figure 7:
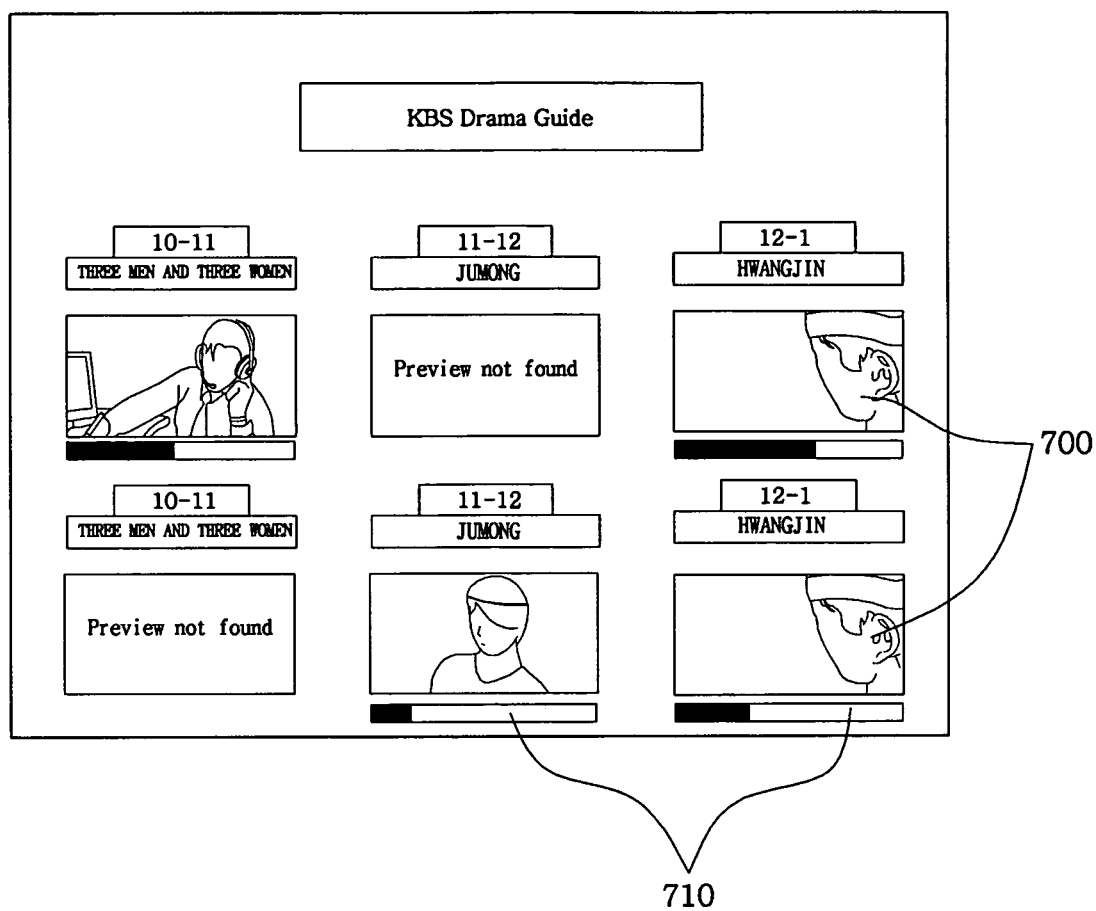

As another example of displaying the program guide service information, as shown in FIG. 7, contents of the program guide service information can be set to be respectively displayed on a plurality of display regions 700 along with corresponding preview content. For example, if the preview content corresponding to one of the contents in the program guide service information is video data, the content and the corresponding preview content can be display on the display region 700 along with a progress bar 710 provided on a lower portion of the display region 700.

Here, if there is no available preview content corresponding to the content displayed on the display region 700, "Preview Not Found" is displayed on the display region 700 to indicate to viewers that there is no available preview content for the content allocated for that display region 700.

If more than one of the preview content corresponding to the contents respectively displayed on the display regions 700 include audio data, it may be difficult for viewers to discern more than one audio data output from the speaker. Therefore, it is preferable to have the application/UI manager 506 to determine the location of the cursor on the program guide service information displayed on the display unit 526 and output only the audio data of the preview content corresponding to the content of the program guide service information indicated by the cursor.

Figure 8:
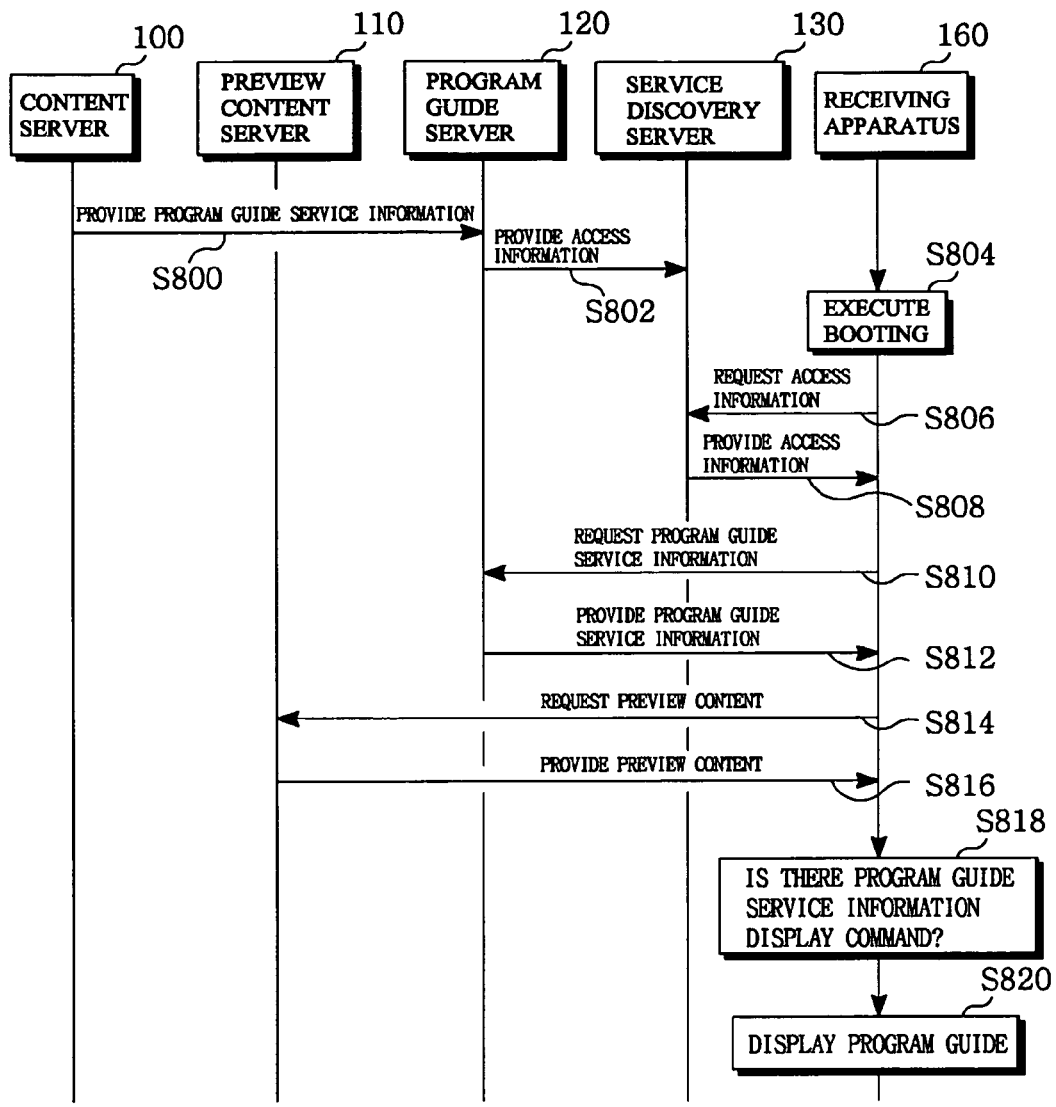
FIG. 8 is a diagram showing a method of receiving preview content, according to an exemplary embodiment of the present invention.

FIG. 8 is a diagram showing a method of receiving preview content, according to an exemplary embodiment of the present invention. As shown in FIG. 8, the content server 100 provides the program guide service information to the program guide server 120 (operation S800), and the program guide server 120 provides the access information to the service discovery server 130 (operation S802). The access information enables the receiving apparatus 160 to access the content server 100, the preview content server 110, and the program guide server 120.

Under the above condition, the receiving apparatus 160 executes booting process (operation S804) and, after the completion of the booting process, requests the access information from the service discovery server 130 (operation S806). Thereafter, the service discovery server 130 provides the access information to the receiving apparatus 160 (operation S808), which will enable to receiving apparatus 160 to access the content server 100, the preview content server 110, and the program guide server 120.

When the receiving apparatus 160 receives the access information provided from the service discovery server 130, the receiving apparatus 160 accesses the program guide server 120 using the access information and requests the program guide service information (operation S810). The program guide server 120 then provides the requested program guide service information to the receiving apparatus 160 (operation S812). The program guide service information includes preview availability information which indicates the availability of preview content and preview information which specifies the available preview content.

Then, the receiving device 160 determines the availability of preview content using the program guide service information and, after determining the availability of the preview content, accesses the preview content server 110 to request the available preview content (operation S814). Thereafter, the preview content server 110 provides the requested preview content to the receiving device 160.

Under these conditions, the receiving apparatus 160 determines whether there is a signal corresponding to a program guide display command input by a user (operation S818). When it is determined that there is a program guide display command, the receiving apparatus 160 displays the program guide service information on the display unit 526 (operation S820). As shown in FIGS. 6 and 7, the program guide service information is displayed with the preview content.

Here, the present invention has been described for the case when the receiving apparatus 160 accesses the preview content server 110 to request the preview content, and then display the requested preview content received from the preview content server 110 along with the program guide service information when a user inputs a program guide service information display command.

However, in another exemplary embodiment of the present invention, the receiving apparatus 160 may access the preview content server 110 after a program guide service information display command has been input by the user to request the preview content, and then display the program guide service information with the preview content received from the preview content server 110.

As described above, according to the present invention, in the case when the service discovery server provides to the receiving apparatus the access information, the access information includes the preview availability information which indicates the availability of preview content and the preview information which specifies the available preview content.

Then, the receiving apparatus determines the availability of the preview content using the program guide service information received from the program guide server and, after determining the availability of the preview content, accesses the preview content server and requests the available preview content. Thereafter, the receiving apparatus display the program guide service information with the preview content received from the preview content server when a user inputs a preview guide information display command.

As a result, through the preview content displayed with the program guide service information, viewers can better determine the nature of contents in the program guide service information to select and watch a desired program.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method of transmitting preview content, comprising:
   providing program guide service information by a content server to a program guide server;
   transmitting the program guide service information by the program guide server to a receiving apparatus when the program guide server is accessed by the receiving apparatus,
   wherein the program guide service information includes preview availability information which indicates whether or not the preview content exists for each of contents in the program guide service information and media format information indicating a encoding format of the preview content; and
   transmitting preview content corresponding to contents of the program guide service information by a preview content server to the receiving apparatus when the preview content server is accessed by the receiving apparatus,
   wherein the preview availability information is transmitted to the receiving apparatus before transmitting the preview content to the receiving apparatus,
   the media format information is transmitted to the receiving apparatus before transmitting the preview content to the receiving apparatus, and
   the media format information is transmitted to the receiving apparatus separately from the preview content.

2. The method of claim 1, further characterized by:
   providing access information of the program guide server and the preview content server by the program guide server to a service discovery server; and
   transmitting the access information by the service discovery server (130) to the receiving apparatus,
   wherein the receiving apparatus accesses the program guide server and the preview content server by using the access information.

3. The method of claim 2, wherein the transmitting of the access information by the service discovery server to the receiving apparatus is implemented by a unicast method which transmits the access information to the receiving apparatus when the receiving apparatus accesses the service discovery server and requests the access information.

4. The method of claim 2, wherein the transmitting of the access information by the service discovery server to the receiving apparatus is implemented by a multicast method which transmits the access information to receiving apparatus if the receiving apparatus is registered with a service discovery group.

5. The method of claim 1, wherein the program guide service information further includes at least one of a preview category, a preview media type, a preview display position, a preview size, a preview start time, a preview display duration, a brief preview description, a preview media locator, and an associated media locator.

6. The method of claim 1, wherein the transmitting of the program guide service information by the program guide server to the receiving apparatus is performed when the receiving apparatus accesses the program guide server and requests the program guide service information.

7. The method of claim 1, wherein the transmitting of the preview content corresponding to the contents of the program guide service information by the preview content server to the receiving apparatus is performed when the receiving apparatus requests the corresponding preview content after determining availability of the preview content using the program guide service information transmitted from the program guide server.

8. The method of claim 1, wherein the program guide service information further includes associated media locator indicating address of contents related to the preview content.

9. An apparatus for receiving preview content, comprising:
   a network interface unit which receives packets including access information, program guide service information, and the preview content;
   an Internet Protocol (IP) manager which transmits the received packets to a relevant manager according to a protocol;
   a service discovery manager which parses the packets and extracts the access information, the program guide service information, and the preview content; and
   an application/user interface manager which controls the network interface unit that accesses a service discovery server to receives the access information, accesses a program guide server using the access information to receives the program guide service information, and accesses a preview content server using the access information to receives the preview content,
   wherein the program guide service information includes preview availability information which indicates whether or not the preview content exists for each of contents in the program guide service information and media format information indicating a encoding format of the preview content,
   wherein the application/user interface manager controls the network interface unit to access the preview content server using the access information and receive the preview content, if the preview availability information indicates that the preview content exists,
   wherein the preview availability information is received before requesting and receiving the preview content,
   the media format information is received before requesting and receiving the preview content, and
   the media format information is separately received from the preview content.

10. The apparatus of claim 9, further characterized by a service information database unit which stores the access information, the program guide service information, and the preview content.

11. The apparatus of claim 9, further characterized by a display unit which displays the program guide service information and the preview content according to control of the application/UI manager.

12. The apparatus of claim 9; wherein the apparatus further comprises;
   a display unit which displays information indicating that no preview content is available when the preview availability information indicates that no preview content is available according to control of the application/UI manager.

13. The apparatus of claim 9, wherein the program guide service information further includes associated media locator indicating address of contents related to the preview content.

14. A method of receiving preview content, comprising:
receiving program guide service information by a network interface unit which accesses a program guide server according to control of an application/user interface manager, wherein the program guide service information includes preview availability information which indicates whether or not the preview content exists for each of contents in the program guide service information and media format information indicating a encoding format of the preview content;
if the preview availability information indicates that the preview content exists requesting and receiving preview content corresponding contents of the program guide service information by the network interface unit which access a preview content server according to control of the application/UI manager; and
displaying the program guide service information and the preview content on a display unit,
wherein the preview availability information is received before requesting and receiving the preview content,
the media format information is received before requesting and receiving the preview content, and
the media format information is separately received from the preview content.

15. The method of claim 14, wherein the network interface unit accesses a service discovery server and receives access information and accesses the program guide server and the preview content server using the access information, according to control of the application/UI manager.

16. The method of claim 14, wherein the program guide service information further includes at least one of a preview category, a preview media type, a preview display position, a preview size, a preview start time, a preview display duration, a brief preview description, a preview media locator, and an associated media locator.

17. The method of claim 14, wherein the application/UI manager determines availability of the preview content using the program guide service information and requests the available preview content from the preview content server to be received by the network interface unit.

18. The method of claim 14, wherein the displaying of the program guide service information is performed when there is a display command to display the program guide service information.

19. The method of claim 14, wherein the method further comprises;
displaying information indicating that no preview content is available when the preview availability information indicates that no preview content is available by a display unit according to control of the application/UI manager.

* * * * *